April 14, 1959   D. H. CLARKE   2,882,166
MANUFACTURE OF AERATED SHORTENING
Filed June 9, 1955
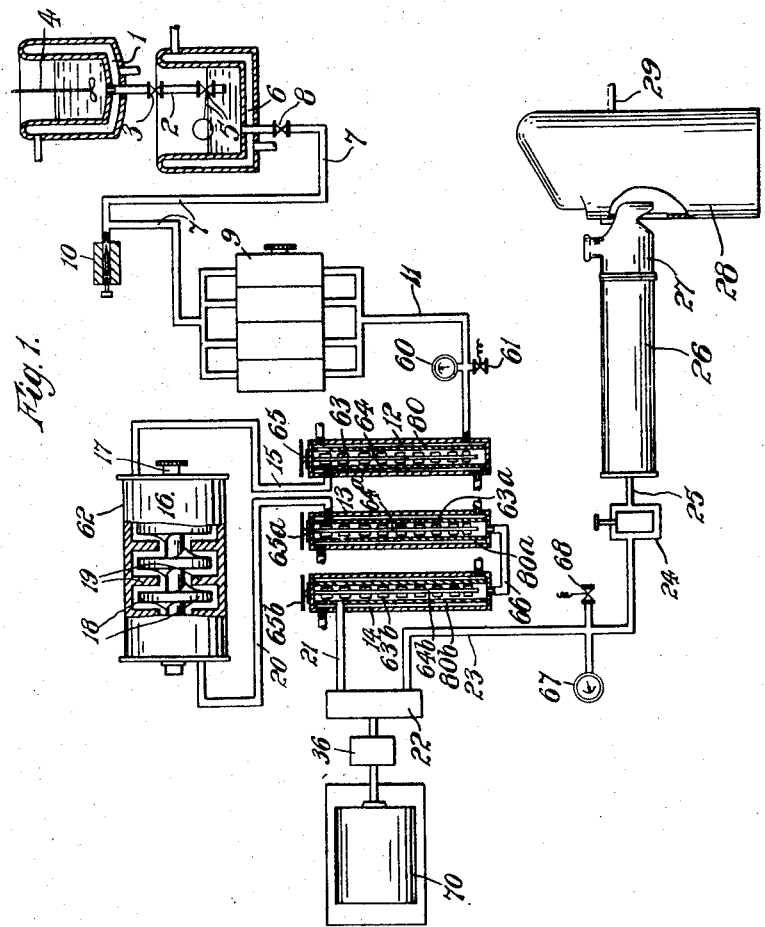
DONALD H. CLARKE
INVENTOR
Campbell, Brumbaugh, Free, & Graves
ATTORNEYS United States Patent Office 2,882,166
Patented Apr. 14, 1959

2,882,166

MANUFACTURE OF AERATED SHORTENING

Donald Hugh Clarke, Upminster, England, assignor to Lever Brothers Company, New York, N.Y., a corporation of Maine Application June 9, 1955, Serial No. 514,253

Claims priority, application Great Britain June 16, 1954

7 Claims. (Cl. 99—118)

This invention relates to the manufacture of shortening. In particular it relates to the manufacture of aerated cooking fat.

A continuous process is known for manufacturing shortening in which liquid fat is subjected to rapid chilling with agitation in a processing apparatus known as a Votator. This type of apparatus is described on pages 702 to 708 of A. E. Bailey's book "Industrial Oil and Fat Products" (Interscience Publishers, Inc., New York, 1945). This Votator includes a so-called "A"-unit comprising one or more thin walled nickel tubes surrounded by a cooling medium such as evaporating liquid ammonia. The tubes are provided with internal rotating blades which remove the thin film of chilled material from their walls. After chilling, the mixture, which is nucleated with minute fat crystals, passes to a "B"-unit of the Votator where crystallisation of the fat is completed.

Shortening made in the above described manner has a tendency to be more difficult to spread, and in addition margarine so made tends to be what is known as "heavy" or "thick" on the palate.

This thickness on the palate in the case of margarine has been overcome by a process outlined in British Patent No. 650,481. This process consists of mixing liquid fat with the aqueous ingredients and passing the resultant mixture in a continuous stream through an apparatus in which it is simultaneously rapidly chilled and agitated. The liquid fat is cooled and agitated so as to separate at least a substantial proportion of the higher melting point glycerides in the fat as crystalline particles without at the same time separating a proportion of the lower melting point glycerides. The cooling and agitating may be carried out either prior to or after mixing the fat with the aqueous ingredients, but before the mixture enters the chilling and agitating apparatus.

Whilst this last described process improves the palatability of margarine, the margarine produced by it tends to be brittle and uneven in texture, possessing what has been described as "bone," namely a texture which is sometimes hard, sometimes soft, across any one cross section of a block of margarine.

Whilst improved palatability is desirable in margarine which has to be consumed as such, it is not as important in the case of other shortenings such as aerated cooking fat, which are not consumed as such, as even texture and freedom from brittleness.

It is therefore an object of the present invention to provide a process of producing an aerated shortening which is of a more even texture and less brittle than shortening hitherto prepared.

The present invention provides a process of producing a shortening which includes the steps of simultaneously rapidly chilling and agitating a stream of liquid fat to form solid and liquid phases, establishing substantial equilibrium between the phases, further simultaneously rapidly chilling and agitating a stream of fat, shearing the fat under pressure and allowing the fat to set.

The fat may be first chilled by a decrease in temperature of about 15 to about 25° C. It may further be chilled by a decrease in temperature of about 10° C. to about 15° C. The actual decrease within the range is of course governed by the nature of the oil charge, the initial temperature of the fat and the necessity for forming solid and liquid phases in the chilled fat. The higher the initial temperature the greater the temperature decrease for any given oil charge.

For best results, the suitably aerated fat should have an initial temperature in the range 30 to 45° C., the actual temperature depending on the fat blend. The whole of the fat to be converted to shortening may be subjected to the steps outlined above.

The first chilling and agitating step may be carried out by passing the stream of liquid fat, suitably aerated, through at least one tube of the "A"-unit of a Votator.

Substantial equilibrium between the solid and liquid phases of the stream of chilled aerated fat is achieved by allowing the chilled fat preferably in the form of a stream, to pass into at least one holding chamber to slow down the rate of flow of the fat stream. To ensure establishment of substantial equilibrium in a time short enough to make continuous processing possible, the chilled fat should be violently agitated in the holding chamber. The time of holding with agitation may vary according to whether the shortening finally prepared is to be packed and wrapped by a type of automatic packing machine which does not function satisfactorily with too soft a product, or whether the product is to be sold in large blocks cut off from a stream of the product of the desired dimensions. In the former case the time of holding with agitation should be less than in the latter case. This may means that in the latter case complete equilibrium between the solid and liquid phases is approached more closely than in the former case, though it is essential in both instances that equilibrium conditions are substantially achieved. The establishment of equilibrium conditions results in a rise in temperature of the chilled material. Preferably this rise in temperature should be between 6 and 10° C.

The second chilling and agitation step may be carried out by passing the equilibrium mixture of phases through at least two tubes of the "A"-unit of a Votator.

Preferably the fat is sheared by momentarily constricting the flow of fat to such an extent that the pressure of the fat stream is increased to a figure of at least 20 kilos/sq. cm. This may be achieved by forcing the fat through a texturising device such as a gate valve, preferably by means of a pressure booster, such as a pump, which may also serve as a working device, for example, a gear pump.

After the fat is subjected to the action of shearing forces it is allowed to set to its final consistency in any suitable manner.

In co-pending application Serial No. 514,251 there is described a process of producing and packing an aerated shortening, consisting of aerating liquid fat with an innocuous gas, chilling a stream of the aerated fat under pressure, crystallising the stream of chilled fat and feeding it directly under pressure to an automatic packing machine, the pressure on the chilled fat being substantially higher than that at which the crystallised fat is fed to the packing machine and being suddenly relieved before crystallisation is completed.

The process of the co-pending application may be combined with that of the present invention to produce an improved non-brittle aerated shortening. In this embodiment of the present invention the liquid fat is aerated prior to the first chilling and agitating step with sufficient innocuous gas to produce after setting an aerated shortening. Pressure conditions are such that all the innocuous gas introduced is dissolved in the fat prior to shearing and is in an entrained state after shearing and are also as required by the invention of the co-pending application.

When processing aerated shortening, such as aerated cooking fat, it is essential to allow the fat to set to its final consistency at as low a pressure as possible, preferably not greater than 2 kilos per sq. cm. Such a low pressure of setting may be achieved by allowing it to set in a setting chamber such as the "B"-unit of a Votator, the cross-sectional area of which setting chamber is large compared with that of the conduit supplying the fat to the shearing device, at least about 50 times as large. Such a setting chamber may require external warming in very cold weather or with certain blends of oil, and such warming may be carried out, for example, by passing water at about 24° C. through a water jacket surrounding the setting chamber. Again, if the shortening finally prepared is to be packed and wrapped in an automatic intermittently operating packing machine, as in co-pending application Serial No. 514,251 the setting chamber may be connected to the packing machine through a connection provided with means for applying intermittent or constant additional pressure to the output of the setting chamber, which means applying additional pressure serves to accommodate the output of the setting chamber during the period of closure of the packing machine. One such connection utilising means for applying intermittent pressure is described in British patent specification No. 590,935. In this arrangement pressure is applied when the packing machine is open to be charged and released while the packing machine is closed. The intermittent or constant pressure in the connection may also be kept low, for example, not above 1.5 kilos/sq. cm. Any overflow conduits from this connection serving to accommodate the material to be packed during the period when the packing machine is not receiving feed, may also be heated externally, for example, to 70° C. by hot water circulating through jackets surrounding the overflow conduit. To counteract a build-up of pressure causing loss of aeration in the shortening should the packing machine stop, the material from the "B"-unit may be automatically diverted on stoppage of the packing machine. Preferably, two shearing devices and two setting chambers working in parallel are arranged to receive the output of the device for increasing the pressure of the fat to at least 20 kilos/sq. cm.

The invention will now be illustrated with reference to the accompanying drawings in which the figure is a diagrammatic arrangement of apparatus for carrying out an embodiment of the invention for continuously producing aerated cooking fat and packaging it by means of an intermittently operated packaging machine.

Referring to the figure a jacketed vessel 1 for liquid fat and fitted with a stirrer 4 is connected by a conduit 2 through a valve 3 to a ball valve 5 of a jacketed constant level tank 6. The exit conduit 7 of the tank 6 connects the tank to a delivery pump 9. The vessel 1, tank 6, conduit 7 and pump 9 constitute the supply means referred to above. Conduit 7 is in the form of an inverted U-tube for part of its length and a needle valve 10 open to the atmosphere is connected to the top length of the inverted U-tube by a conduit approximately 60 cms. long as shown. The valve 10 is above the level of any liquid fat in the constant level tank 6. The exit conduit 11 of the pump 9 is provided with a pressure gauge and safety valve and discharges into one tube 12 forming part of the "A"-unit of a three-tube Votator, of which 13 and 14 are the other two tubes. The exit 15 of the tube 12 is connected to a crystallising unit 16, constituting the holding vessel referred to above. The crystallising unit 16 consists of a cylinder fitted with an axial shaft 17 carrying a row of radial rods 18 helically arranged through 120° and intermeshing with a fixed array of rods 19 attached to the wall of the cylinder. Conduit 20 connects the crystallising unit 16 to the inlet side of tube 13 which is connected in series with tube 14. The exit conduit 21 of the tube 14 is connected to the inlet of a gear pump 22 driven by a motor through a variable speed gear box 36, the exit conduit 23 of which carries a pressure gauge and is connected to a gate valve which in turn is connected through a conduit 25 to the setting chamber or "B"-unit of the Votator 26. The exit of chamber 26 is connected by a suitable arrangement of flanges to a coupling arrangement 27, details of which are given in British patent specification No. 590,935. The coupling arrangement 27 is directly connected to an intermittently operating packing machine 28 in the manner described in British patent specification No. 590,935. A conveyor 29 is provided for removing wrapped packets from the vicinity of the packing machine.

Preferably, conduit 23 is connected to two systems, each consisting of a gate valve 24 connected to conduit 25, setting chamber 26, coupling arrangement 27, packing machine 28 and conveyor 29, the two systems being arranged in parallel. However, for the sake of simplicity, only one such system is illustrated and described hereinafter.

The operation of the above described arrangement is as follows.

A suitable fat blend maintained at a temperature of 39° C. by warm water in the jacket of vessel 1 is fed from this vessel by gravity to the constant level tank 6 where it is kept at 39° C. by warm water circulating through the jacket of tank 6. From tank 6 the liquid fat blend is drawn by the delivery pump 9 and injected at a pressure of about 17.5 kilos/sq. cm. into the tube 12. A controlled supply of air from the atmosphere or inert gas such as nitrogen is drawn through needle valve 10 into the fat stream in conduit 7. The supply of refrigerant to tube 12 and the speed of throughput through tube 12 are adjusted so that a sudden drop in temperature to about 21° C. occurs in tube 12. The agitation in tube 12 should be of such an order that the drop in temperature which first occurs on the material nearest the wall of the tube is transmitted to the whole of the fat passing through the tube in a matter of seconds, for example, say five seconds. After leaving tube 12, the material which now contains nuclei of both high and low melting point glycerides passes through conduit 15 to crystallising unit 16. In crystallising unit 16 the nuclei separated out in tube 12 crystallise. A rise in temperature due to liberation of heat of crystallisation occurs. The shaft 17 is rotated at such a speed as to cause violent agitation of the material in unit 16. The dimensions of unit 16 are so chosen and the degree of agitation such that at the temperature prevailing at the exit of unit 16 the greater part of crystals capable of separating have so separated and the state of equilibrium between the solid and liquid phases has almost, if not definitely, been achieved. To achieve absolute equilibrium it would be necessary in this embodiment of the invention to hold the material for a longer time with agitation in further units such as unit 16. Whilst this would be desirous in reducing the brittleness of the ultimate product, it would create difficulties in the operation of the packaging machine 28 due to excessive work softening caused by the agitation. A balance has therefore to be struck between the degree of brittleness in the final product and its packability. A single unit 16 of dimensions 33 cms. diameter and 114 cms. long with an agitator working at 230 r.p.m. has been found satisfactory in this case for giving an improved product as regards brittleness which can be satisfactorily packed in the machine 28. The temperature of the equilibrium mixture leaving unit 16 is about 25 to 27° C. It then passes to the tubes 13 and 14 where it is subjected to a further sudden drop in temperature until its temperature is about 14° C. As in tube 12, speed of agitation and throughput in tubes 13 and 14 are arranged so that the temperature drop is distributed throughout the whole of the material passing through the tubes in a matter of seconds. The material leaving tube 14 is then passed through the gear pump 22 which as well as working the material raises its pressure to above 20 kilos/sq. cm, and preferably 60 kilos/sq. cm. The material at this high pressure is forced through the gate valve 24 which is only just cracked open so as to present a very small orifice for passing of the material. Considerable shearing forces act on the material as it passes through the valve 24. After passage through valve 24 and the conduit 25 the stream of material suddenly expands into the "B"-unit 26. The length of the conduit 23 linking the gear pump 22 and the valve 24 is critical in achieving a product of the desired reduced brittleness. Generally speaking, this conduit should be approximately 2.5 cms. internal diameter and between 50 cms. and 75 cms. long. After setting has been completed in the unit 26, the set material passes to the coupling arrangement 27 and then to the packing machine 28. Both the coupling arrangement 27 and the packing machine 28 operate as described in British patent specification No. 590,935 and the wrapped packets are conveyed from the machine by conveyor 29.

The invention is not limited to the particular arrangements described above and many modifications would be readily apparent to those skilled in the art. The invention will now be illustrated by means of the following examples dealing with the processing of a specific oil blend in the arrangements described above.

*Example 1*

This example illustrates the preparation of an aerated cooking fat. The following oil blend was processed as described above with reference to Fig. 1:

| Oil: | Percent |
|---|---|
| Groundnut oil | 20 |
| Palm oil | 30 |
| Coconut oil | 10 |
| Whale oil hardened to a melting point of 37° C. | 40 |

In the processing the initial temperature of the fat in the vessel 1 was 39° C. The needle valve 10 was adjusted so as to give an air content of 7% (ccs. per 100 grams) in the cooking fat ultimately produced. The fat blend was pre-cooled in the tube 12 of the "A"-unit of the Votator to 19° C. and left the crystallising unit 16 at a temperature of 26.5° C. The pressure of the fat in the tube 12 of the "A"-unit of the Votator was 10.5 kilos/sq. cm. It was cooled suddenly to a temperature of 13° C. in the tubes 13 and 14 of the "A"-unit of the Votator. The gear pump 22 and gate valve 24 were adjusted to impart a pressure of 49 kilos/sq. cm. to the material in the conduit 23. The material, after passing the gate valve, entered the "B"-unit 26 of the Votator at a pressure of 1.0 to 1.4 kilos/sq. cm. where it set. The air pressure on the piston of the coupling arrangement 27 was 1.0 kilos/sq. cm.

I claim:
1. A continuous process of producing and packaging an aerated substantially water-free shortening which comprises placing a stream of substantially water-free, chilled, aerated, partially crystallized fluid fat under a high pressure, further crystallizing the stream of chilled, aerated fat, and suddenly releasing all of said pressure before said further crystallization is complete, the crystallized portion of said stream of substantially water-free, chilled, aerated, partially crystallized fluid fat being the higher melting point glycerides thereof.

2. A continuous process of producing and packing an aerated, substantially water-free plastic shortening agent which comprises aerating a stream of substantially water-free liquid fat with an innocuous gas, simultaneously chilling and agitating the stream of fat under pressure to crystallize the higher melting point glycerides therein, establishing substantial equilibrium between the solid and liquid phases by passing the stream of fat through a holding chamber with agitation, simultaneously further chilling and agitating the stream of fat, further crystallizing the stream of chilled, aerated fat and feeding it to an automatic packing machine, said stream of fat undergoing a rapid reduction in pressure before crystallization is substantially complete to cause the dissolved gas to change from the dissolved to the entrained state, said pressure on the chilled, aerated fat before the pressure reduction step being sufficiently high to retain the gas in the shortening in a dissolved state and said pressure on the chilled, aerated fat after the pressure reduction step being less than 2 kilos per sq. cm. above atmospheric pressure to maintain a substantial proportion of the gas in the entrained state.

3. A process as claimed in claim 2 in which the pressure is relieved almost immediately after the cessation of the chilling steps.

4. A process as claimed in claim 2 in which the surfaces of the crystallized fat stream are warmed before the crystallized fat is packed.

5. A continuous process of producing and packing an aerated, substantially water-free plastic shortening agent which includes the steps of aerating liquid fat with an innocuous gas, simultaneously chilling and agitating a stream of the liquid fat having a temperature between 30° and 45° C. to lower its temperature by between 15° and 25° C. and to selectively crystallize the higher melting point glycerides therein, establishing substantial equilibrium between the solid and liquid phases by agitating the stream of fat in a holding chamber until the temperature of the fat rises by between 6° and 10° C., further simultaneously chilling and agitating the stream of fat by passing the equilibrium mixture through a chilling device to lower the temperature of the fat by between 10° and 15° C., further crystallizing the fat, and feeding the stream of crystallized fat to an automatic packing machine, said fat being subjected to a pressure of at least 20 kilos per sq. cm. above atmospheric pressure immediately prior to the second crystallization step and to a pressure of less than 2 kilos per sq. cm. above atmospheric pressure during at least a portion of the crystallizing step, the pressure difference being created by constricting the stream of chilled, aerated fat before crystallization is completed and by allowing the fat stream to expand suddenly in the crystallization chamber before crystallization has substantially completed.

6. A continuous process of producing and packing an aerated, substantially water-free plastic shortening agent which includes the steps of aerating liquid fat with an innocuous gas, simultaneously chilling and agitating a stream of the liquid fat having a temperature between 30° and 45° C. to lower its temperature by between 15° and 25° C. and to selectively crystallize the higher melting point glycerides therein, establishing substantial equilibrium between the solid and liquid phases by agitating the stream of fat in a holding chamber until the temperature of the fat rises by between 6° and 10° C., further simultaneously chilling and agitating the stream of fat by passing the equilibrium mixture through a chilling device to lower the temperature of the fat by between 10° and 15° C., further crystallizing the fat, feeding the stream of crystallized fat to an automatic packing machine, and warming the surfaces of the stream of crystallized fat being fed to the packing machine, said fat being subjected to a pressure of at least 20 kilos per sq. cm. above atmospheric pressure during said chilling steps and to a pressure of less than 2 kilos per sq. cm. above atmospheric pressure during at least a portion of the last crystallizing step, the pressure difference being created by constricting the stream of chilled fat before crystallization is completed and by allowing the fat stream to expand suddenly in the crystallization chamber before crystallization has substantially completed.

7. A process as claimed in claim 5 in which the pressure on the fat stream prior to the sudden reduction thereof is about 60 kilos per sq. cm. atmospheric.

References Cited in the file of this patent

UNITED STATES PATENTS

| | | |
|---|---|---|
| 2,063,065 | Vogt et al. | Dec. 8, 1936 |
| 2,206,419 | Miller | July 2, 1940 |
| 2,223,724 | Godfrey et al. | Dec. 3, 1940 |
| 2,330,986 | Miller et al. | Oct. 5, 1943 |
| 2,357,896 | Howe | Sept. 12, 1944 |
| 2,386,775 | Balzarini | Oct. 16, 1945 |
| 2,395,051 | Horneman | Feb. 19, 1946 |
| 2,592,224 | Wilson et al. | Apr. 8, 1952 |
| 2,611,707 | Rouke et al. | Sept. 23, 1952 |
| 2,728,675 | Griffin et al. | Dec. 27, 1955 |